Sept. 2, 1969    C. C. PIERCE    3,464,738
DYNAMIC WHEEL BALANCING MEANS
Filed March 11, 1968
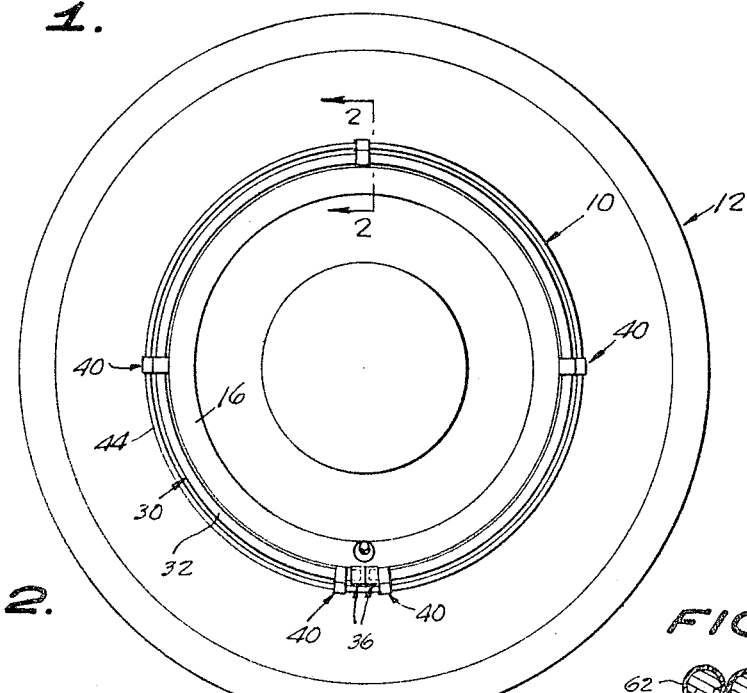
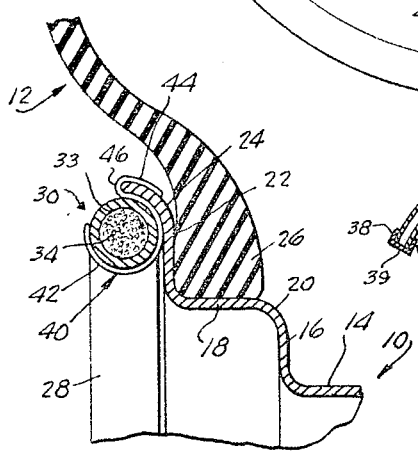
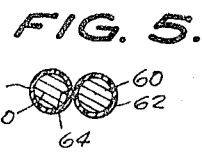
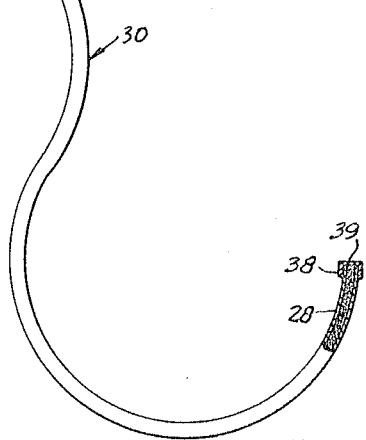
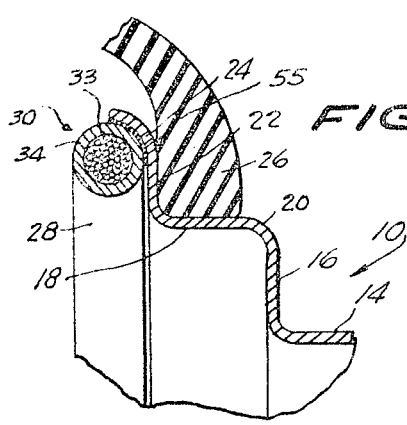
INVENTOR.
COMER C. PIERCE,
BY Kimmel, Crowell & Weaver
ATTORNEYS.

United States Patent Office 3,464,738
Patented Sept. 2, 1969

3,464,738
DYNAMIC WHEEL BALANCING MEANS
Comer C. Pierce, 1100 Universal Marion Bldg., 21 W.
Church St., Jacksonville, Fla. 32202
Filed Mar. 11, 1968, Ser. No. 712,249
Int. Cl. B60b 1/00, 27/00; G05g 1/00
U.S. Cl. 301—5          8 Claims

ABSTRACT OF THE DISCLOSURE

An attachment for vehicle or other wheels having an imbalanced condition and comprising an elongated length of a hollow conduit having a pair of opposed open ends, the conduit having an arcuate configuration conforming to the peripheral marginal edge of the wheel to which the attachment is to be secured; an aggregate disposed within said conduit and partially filling the same; individual means for closing each respective end of said conduit; and, means for connecting the aggregate carrying conduit to the aforementioned marginal edge of said wheel.

Background of the invention

The static balancing of vehicle and other types of wheels is old and well known in the art. Such static balancing usually involved the application of weights to a wheel rim at predetermined spaced positions thereon. Such static balancing offers many disadvantages, among which may be listed the inadvertent and accidental shifting of the weights from their preselected positions and, of course, the obvious disadvantage of being incapable of automatic adjustment to correct imbalance due to the uneven wear on a tire or the picking up of an object which will adhere to the tire and while will throw a perfectly balanced wheel into immediate imbalance. Likewise, the dynamic balancing of wheels is also an old and well known prior art practice. Examples of this type of balancing means are provided in my earlier United States patents numbered 3,006,690, 3,063,754 and 3,202,459, respectively. Additionally, these and other prior art efforts for automatically correcting the imbalance of a vehicle wheel require special installation techniques, the stocking of many different sizes of wheel balancing attachment means, the use of special installation tools, and, perhaps, the most important, the involved high costs for manufacturing such devices.

It is, therefore, one of the primary objects of this invention to provide a vehicle wheel balance correcting attachment which may be economically manufactured with an attendant low cost retail price.

Another object of this invention is to provide a balancing device for vehicle wheels of various diameters and wherein the device includes a length of a hollow tubular conduit which may be severed at predetermined intervals corresponding, substantially, to the circumferential or peripheral marginal edge length of the wheel to which the attachment is to be secured.

A further object of this invention is to provide an automatic wheel balancing device of the type generally referred to above and wherein the conduit is at least partially filled with an aggregate material.

Still another object of this invention is to provide an automatic wheel balancing device of the type generally described supra and wherein the opposed ends of the conduit receive individual closure means.

This invention contemplates, as a still further object thereof, the provision of a wheel balancing device for automotive vehicles wherein the device is inexpensive to manufacture and maintain, non-complex in construction and assembly, and which is rugged and durable in use.

Other and further objects and advantages of the instant invention will become more evident from a consideration of the following specification when read in light of the annexed drawing.

In the drawing:

FIGURE 1 is a side elevational view of an automotive vehicle wheel and tire and showing the wheel balancing device according to this invention in its mounted position on the wheel;

FIGURE 2 is an enlarged fragmentary detail transverse cross-sectional view, FIGURE 2 being taken substantially on the vertical plane of line 2—2 of FIGURE 1, looking in the direction of the arrows and illustrating one mode of attachment of the device to the wheel;

FIGURE 3 is a side elevational view, partly broken away and in cross-section, of the wheel balancing attachment shown in FIGURE 1;

FIGURE 4 is an enlarged fragmentary detail transverse cross-sectional view similar to FIGURE 2, FIGURE 4 illustrating another mode of attaching the device to the vehicle wheel; and FIGURE 5 is an enlarged medial transverse cross-sectional view of a plurality of aggregate elements constructed in accordance with the preferred embodiment of this invention.

Referring now more specifically to the drawing, reference numeral 10 designates, in general, a conventional automotive vehicle wheel having the usual valved tire 12 mounted thereon. The wheel 10, as is customary, includes a substantially cylindrical rim 14 which is integrally connected at one of its ends with a laterally and outwardly extending riser 16, and the latter, at its opposed end, is integral with one end of a substantially cylindrical tire mounting flange 18 substantially concentric with respect to the rim 14. As is seen in FIGURE 2 of the drawing, the connection between the adjacent ends of the riser 16 and the tire mounting flange 18 includes an arcuate bight portion 20 to which further reference will be made infra.

The outer end of the cylindrical tire mounting flange 18 is integrally connected with one end of the tire guard flange 22 which extends laterally away therefrom in the same direction as the riser 16, and the outer end of the guard flange 22 is reverted to form a terminal arcuate flange 24.

FIGURE 2 of the drawing shows the tire 12 as being mounted on the rim 10 in the customary manner, that is, the bead 26 of the tire 12 is superimposed or seated against the tire mounting flange 18 with a portion of the bead 26 normally engaging the guard flange 22. The details of the wheel construction and that of its associated tire are here but briefly presented for the same do not constitute the subject matter of this invention, per se, and are submitted herein only for illustrative background purposes.

The wheel balancing device or attachment constructed in accordance with the teachings of this invention is generally designated by the reference numeral 30 and which may have any desired external configuration. The attachment as illustrated in FIGURE 3 comprises an elongated length of, preferably, a hollow flexible cylindrical conduit formed of a plastic such as vinyl or other suitable material, the conduit 30 including an annular sidewall 32 of substantially uniform transverse cross-sectional configuration throughout its axial length and including the hollow cylindrical axially extending passageway 33. The conduit 30 is partially filled with any suitable dry and free running aggregate material 34 of appreciable mass, and the ends of the conduit 30 are provided with closure means here bearing the reference numeral 36.

In the specific embodiment of this invention illustrated in FIGURE 3 of the drawing, the closure means 36 comprises a substantially hollow cylindrical sleeve 38 which telescopically receives through one end thereof one of the ends of the conduit 30, and one end of the sleeve 38 is integrally connected with a transversely extending end closure wall 39 to close the aforementioned end of the sleeve and the adjacent end of the conduit 30. The closure means 36 may be permanently or temporarily connected on their respective ends of the conduit 30, all as desired.

As is shown in FIGURES 1 and 2 of the drawing, the partially filled and capped conduit 30 is now bent and flexed into a substantially annular configuration and is superimposed against the exterior side of the guard flange 22 and nests in the terminal arcuate flange 24 in which it is secured by suitable means to be described.

In FIGURES 1 and 2, the securing means are seen to comprise a plurality of compound clips each of which bear the reference numeral 40. Each of the clips 40 has a substantially S-shaped configuration and includes a first concave-convex arm 42 and a second reverted concave-convex arm 44, the arms 42, 44 having a pair of adjacent ends connected by a rib 46. As is seen in FIGURE 2 of the drawing, the arm 42 partially encircles the exterior side of the conduit 30 while the arm 44 extends over the arcuate terminal flange 24 and fits flush thereover.

In mounting the conduit 30 on the wheel 10, the end closure walls 40 are, preferably, disposed in abutting relationship with respect to each other and are, preferably, located immediately proximate the valve and valve stem assembly here indicated in FIGURE 1 by reference numeral 50. A pair of the clips 40 are positioned immediately adjacent the inner ends of each of the sleeves 38, respectively, while the remaining clips 40 are suitably spaced circumferentially therefrom.

The manner by which the conduit 30 is connected to the wheel 10 is not, per se, critical of the performance of the wheel balancing attachment. For example, FIGURE 4 illustrates another means for effecting the securement of the conduit 30 to the wheel. In this embodiment of the invention, the conduit 30 is inset into the terminal arcuate flange 24, as before, and is secured therein as by any suitable adhesive 55 and which may include, if preferred, a plastic fusion.

The use and operation of the conduit 30 is well known in the art and requires but little explanation. As the wheel 10 and its connected tire 12 rotate, the aggregate 34 tends to distribute itself evenly about the interior of the conduit 30 under conditions of perfect balance. However, upon the presence or the occurrence of an unbalanced or imbalanced condition of the wheel and tire, the aggregate 34 will, by centrifugal force, move to that side of the conduit 30 opposite the heavy side of the wheel and tire to equalize the same. A condition of substantially perfect dynamic wheel balance is, therefore, immediately achieved when the speed of the rotation of the wheel is sufficiently great as to cause the aggregate to move under the influence of centrifugal force.

In the description of the attachment or conduit 30 as presented above, the attachment was stated as being formed of a flexible material preferably one of plastic. Such a construction comprises one of the preferred embodiments of this invention for plastic hollow cylindrical conduits of any desirable length may be extruded by conventional practices very inexpensively. Such lengths of conduit may be easily transported between the point of manufacture and a garage or other establishment wherein the attachment 30 is to be installed. There the manufactured length of the hollow conduit may be cut at predetermined points, all depending upon the circumferential length of conduit 30 required as measured at its point of installation circumferentially about the wheel 10.

Under such circumstances, very little wastage is encountered and a low inventory is achieved since it is unnecessary for the accessory supplier to maintain in stock annular tubing cut to specific lengths to accommodate wheels having differing diameters. This constitutes a very important feature of the instant invention since it contributes to the provision of a very low cost wheel balancing attachment.

Another low cost factor which contributes to the economic construction of a wheel balancing attachment such as is designated by reference numeral 30 comprises the aggregate, per se. The aggregate here indicated by reference numeral 34 may be formed of any free flowing particulate or particle solid matter, and in the satisfactory and efficient operation of the device, the aggregate may have any external configuration. Thus, the present invention contemplates the use of an aggregate which may comprise sand, small pebbles or crushed stone, and/or spherical weights such as may be formed of lead or steel and which may take the type of conventional shot or ball bearings, respectively. The cost of the aggregate is, thus, left much to the dictates of the manufacturer of the attachment and may, under many conditions of usage, constitute only a nominal expense.

Certain aggregates have the characteristic of producing unwanted noises when used in conjunction with this inventive concept. Steel bearings, for example, are capable of generating such noises. To eliminate the noise, reference being made to FIGURE 5 of the drawing, it is proposed to coat such spherical elements designated by reference numeral 60, with a coating 62 formed of rubber or other suitable similar materials so that when two or more of the coated elements 60 make tangential contact as at 64, no noise is produced.

Still further, and constituting another unique feature which resides in this invention, is the use of the pair of end closure means 36. While in the preferred embodiment described above the closure means 36 is defined as comprising a sleeve 38 having an end closure wall 40 extending across one end thereof, it should be obvious to those skilled in this art that satisfactory substitute means could be provided therefor. To this end, for example, the invention contemplates the provision of any suitable plug which may be inserted within the ends of the conduit 30 to seal the same or any other type of stopper means which will effectively close the opposed ends of the conduit 30 to prevent the escape of the aggregate 34 therefrom.

It is of prime importance, and this invention so recognizes the same, that the opposed ends of the conduit or accessory 30 be closed or plugged to restrict the free flow of the movement of the aggregate within the conduit 30 through a path of travel of less than 360°. The effectiveness of the wheel balancing apparatus 30 would be impaired should the aggregate 34 be permitted to move through a complete circular path of travel of 360° or more. But it is essential to the optimum operation of the apparatus that the aggregate be permitted to flow freely through its restricted path of travel and consequently, and has been stated above, the conduit or attachment 30 is but partially filled with its aggregate material. It is impossible to offer an empirical equation which would satisfy all conditons of usage, but by way of example, and depending upon the volume and mass of the aggregate, a substantially perfect wheel balance was obtained with a conduit having an axial length of 48 inches and which was filled with a column of aggregate standing from 3 inches to 45 inches in height. The criterion is, of course, that the aggregate must be permitted free flow between the capped ends of the conduit 30 and it will be understood that the mass of the aggregate must at least equal the weight of the imbalance portion of the wheel to which the attachment 30 is connected.

By using a flexible plastic conduit, and through the use of at least one removable or temporarily secured closure means 36, aggregate 34 may be added to or removed from the apparatus without removing the attachment, in its entirety, from the wheel. The installer need but remove one of the clips 40 adjacent one of the capped ends of the conduit 30 and rotate the wheel 10 in such a manner as to permit the aggregate to discharge downwardly therefrom or to move the opened end of the conduit 30 to face upwardly to receive additional aggregate therein. Thereafter, the open end of the conduit 30 may be resealed and resecured to the wheel in the manner described above.

It is of importance, however, that the capped ends of the annular attachment 30 be disposed on the circle of the circumference thereof to prevent the free flow of the aggregate throughout an arc of 360°.

Substantially the same objects and advantages of this invention may be attained if the conduit or attachment 30 is formed of a relatively rigid material such as of a metal. Such metal conduits must be possessed of sufficient flexibility as to permit the same to be bent to a substantially annular configuration and to retain this deformation after the bending pressure has been released. Such metallic conduits would then be provided with end closure means of the type described above or other suitable means to plug the open ends thereof to prevent the escape of the aggregate material.

In all forms of this inventive concept, it is important that the capped ends of the conduit 30 not only be disposed substantially within the circumference of the so formed annulus, but additionally, the capped ends should be disposed in abutting or close, juxtaposition relative to each other.

Having described and illustrated several embodiments of this invention in detail, it will be understood that the same are offered merely by way of example.

What is claimed is:

1. An article of manufacture comprising a wheel balancing device including an elongated length of hollow tubular conduit having a pair of opposed open ends;
   closure means for each of said ends;
   aggregate means encased in a plastic sound eliminating material loosely disposed within said conduit and free to move between its said closed ends; said conduit be formed of flexible plastic material having a uniform internal hollow cylindrical transverse cross-sectional configuration throughout its length;
   said aggregate being free to flow between the closed ends of said conduit and having a mass at least equal to the weight of the imbalanced portion of said wheel; and
   said closure means comprising end caps.

2. An article of manufacture as defined in claim 1 wherein
   said end caps are disposed in close juxtaposition relative to each other.

3. A wheel balancing attachment as defined in claim 2 wherein
   said conduit is formed of a flexible plastic material having a substantially uniform internal and external diameter throughout its length; and
   said closure means are disposed on the circumference of said annular conduit.

4. An attachment as defined in claim 3 wherein said wheel includes an outwardly opening terminal arcuate flange; and
   said annular conduit is disposed within said terminal arcuate flange.

5. In a dynamic wheel balancing attachment the combination with the wheel having a rim and a tire mounted thereon, said rim having a terminal arcuate flange;
   a length of hollow tubular conduit having a substantially annular configuration and a pair of opposed adjacent ends;
   closure means for each of said ends;
   an aggregate mass disposed within said conduit and being freely movable throughout the arcuate axis thereof; and
   means connecting said conduit on said wheel in concentric relation relative to the axis of rotation of said wheel.

6. An attachment as defined in claim 5, and
   means for releasably connecting said closure means on said ends of said conduit; and
   means for releasably connecting said annular conduit on said terminal arcuate flange.

7. An attachment as defined in claim 6 wherein
   said closure means each includes a cap having a cylindrical sleeve telescopically receiving its associated end for securement therein, and a transversely extending end wall closing one end of each sleeve and the adjacent end of said conduit; and
   said end walls are disposed in confronting adjacent juxtaposition relative to one another.

8. A method for constructing balancing means for a wheel having a circumferential peripheral flange comprising the steps of
   cutting a hollow tubular conduit having a pair of opposed open ends to an axial length substantially equalling the circumference of said flange;
   closing one end of said conduit;
   placing in said conduit a dry aggregate to occupy a space less than the total volumetric capacity of said conduit;
   closing the other end of said conduit;
   bending said conduit into an annular configuration with said closed ends being juxtaposed relative to one another; and
   securing said annularly shaped conduit to said flange.

References Cited

UNITED STATES PATENTS

| 414,642 | 11/1889 | Herrick | 74—573 |
| 817,462 | 4/1906 | Backus. | |
| 1,254,115 | 1/1918 | Brand. | |
| 3,006,690 | 10/1961 | Pierce | 301—5 |
| 3,202,459 | 8/1965 | Pierce | 301—5 |

RICHARD J. JOHNSON, Primary Examiner

U.S. Cl. X.R.

74—573